United States Patent
Lee et al.

(10) Patent No.: US 9,118,920 B2
(45) Date of Patent: Aug. 25, 2015

(54) METHOD AND APPARATUS FOR ENCODING IMAGE AND METHOD AND APPARATUS FOR DECODING IMAGE

(71) Applicant: Korea University Research and Business Foundation, Seoul (KR)

(72) Inventors: Suk Kyu Lee, Seoul (KR); Hwangnam Kim, Seoul (KR); Seungho Yoo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 68 days.

(21) Appl. No.: 14/075,931

(22) Filed: Nov. 8, 2013

(65) Prior Publication Data

US 2015/0131920 A1    May 14, 2015

(51) Int. Cl.
*G06K 9/36* (2006.01)
*H04N 19/167* (2014.01)
*H04N 19/124* (2014.01)

(52) U.S. Cl.
CPC ........... *H04N 19/167* (2014.11); *H04N 19/124* (2014.11)

(58) Field of Classification Search
USPC ................ 382/232, 233, 240, 243, 162, 181; 375/240.13, 240.08, E7.029; 348/240.99, 222.1, E5.051
See application file for complete search history.

(56) References Cited

U.S. PATENT DOCUMENTS

| | | | |
|---|---|---|---|
| 6,937,773 B1 * | 8/2005 | Nozawa et al. | 382/243 |
| 7,162,095 B2 * | 1/2007 | Chen et al. | 382/240 |
| 8,144,997 B1 * | 3/2012 | Ding | 382/232 |
| 8,498,483 B2 * | 7/2013 | Noguchi et al. | 382/181 |
| 8,503,802 B1 * | 8/2013 | Ding | 382/232 |
| 8,755,614 B1 * | 6/2014 | Ding | 382/232 |

* cited by examiner

*Primary Examiner* — Anh Do
(74) *Attorney, Agent, or Firm* — Flaster/Greenberg P.C.

(57) ABSTRACT

An image encoding apparatus and method and an image decoding apparatus and method are disclosed. The image encoding method may include extracting a ROI from an input image, determining a compression rate of a remaining region excluding the ROI of the image based on a network state between the image transmitting apparatus and the image receiving apparatus, and encoding the remaining region based on the compression rate.

18 Claims, 11 Drawing Sheets

METHOD AND APPARATUS FOR ENCODING IMAGE AND METHOD AND APPARATUS FOR DECODING IMAGE

BACKGROUND OF THE INVENTION

1. Field of the Invention

A following description relates to a method for encoding and decoding an image, and more particularly, to a method of encoding an image adaptively to a wireless environment and a decoding method corresponding to the encoding method.

2. Description of Related Art

A joint photographic experts group (JPEG) refers to a worldwide technology for image compression, which is divided into an encoder and a decoder. The encoder compresses an image by performing discrete cosine transform (DCT), quantization, and entropy encoding. Compressed image data is generated as a result of the foregoing processes. The compressed image data is transmitted and stored in the compressed form until reconstructed by the decoder. The decoder reconstructs the compressed image data by performing the foregoing processes in reverse order-dimensional (3D).

Moving picture experts group (MPEG) refers to a group in charge of development of the multimedia standard, and also refers to the standard established by the group. According to an image compression technology of MPEG, inter-frame coding and intra-frame coding are added to the JPEG technology. An MPEG image is transmitted in uniform size per time based on a predetermined data rate and a compressed image is output by an MPEG decoder as original image information. In addition, the MPEG technology transmits data based on motion of a current frame and a following frame using a motion vector.

In a wireless communication environment, a strength of a signal may be varied according to a radio wave environment and a movement of a terminal. Yield of the network may also be abruptly changed according to the strength of the signal. Therefore, when streaming an image content using the image compression technology in the wireless communication environment, the stream may be interrupted in an area where the signal strength is low or where the wireless communication environment is relatively unfavorable. Accordingly, there is a desire for a technology achieving image compression efficiently and adaptively to the wireless communication environment.

BRIEF SUMMARY OF THE INVENTION

According to an aspect of the present invention, there is provided an image encoding method for an image transmitted between an image transmitting apparatus and an image receiving apparatus, the method including extracting a region of importance (ROI) from an input image, determining a compression rate of a remaining region excluding the ROI of the image based on a network state between the image transmitting apparatus and the image receiving apparatus, and encoding the remaining region based on the compression rate.

The image encoding method may further include generating a bitstream by combining the remaining region which is encoded with the ROI which is not encoded.

According to another aspect of the present invention, there is provided an image decoding method for an image transmitted between an image transmitting apparatus and an image receiving apparatus, the method including dividing a bitstream transmitted by the image transmitting apparatus based on a number of macro blocks (MBs) applied to the image, and decoding a remaining region excluding a ROI of the image in the divided bitstream, wherein the bitstream is generated by combination of the remaining region which is encoded with the ROI which is not encoded.

According to another aspect of the present invention, there is provided an image encoding apparatus including a ROI extractor to extract a ROI from an input image, a compression rate determiner to determine a compression rate of a remaining region excluding the ROI from the image based on a network state between the image transmitting apparatus and the image receiving apparatus, and an image encoder to encode the remaining region based on the compression rate.

According to another aspect of the present invention, there is provided an image decoding apparatus including a bitstream divider to divide a bitstream transmitted by the image transmitting apparatus based on a number of MBs applied to an image, and an image decoder to decode a remaining region excluding a ROI from the image in the divided bitstream, wherein the bitstream is generated by combination of the remaining region which is encoded and the ROI which is not encoded.

According to another aspect of the present invention, there is provided an image encoding method for an image transmitted between an image transmitting apparatus and an image receiving apparatus, the method including extracting a ROI from an input image, determining compression rates of the ROI and a remaining region excluding the ROI of the image based on a network state between the image transmitting apparatus and the image receiving apparatus, and encoding the ROI and the remaining region based on the compression rates.

According to another aspect of the present invention, there is provided an image decoding method for an image transmitted between an image transmitting apparatus and an image receiving apparatus, the method including dividing a bitstream transmitted by the image transmitting apparatus based on a number of MBs applied to the image, and decoding a ROI and a remaining region excluding the ROI of the image, based on a compression rate adaptively determined according to a network state between the image transmitting apparatus and the image receiving apparatus.

BRIEF DESCRIPTION OF THE SEVERAL VIEWS OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE INVENTION

Reference will now be made in detail to exemplary embodiments of the present invention, examples of which are illustrated in the accompanying drawings, wherein like reference numerals refer to the like elements throughout.

Figure 1:
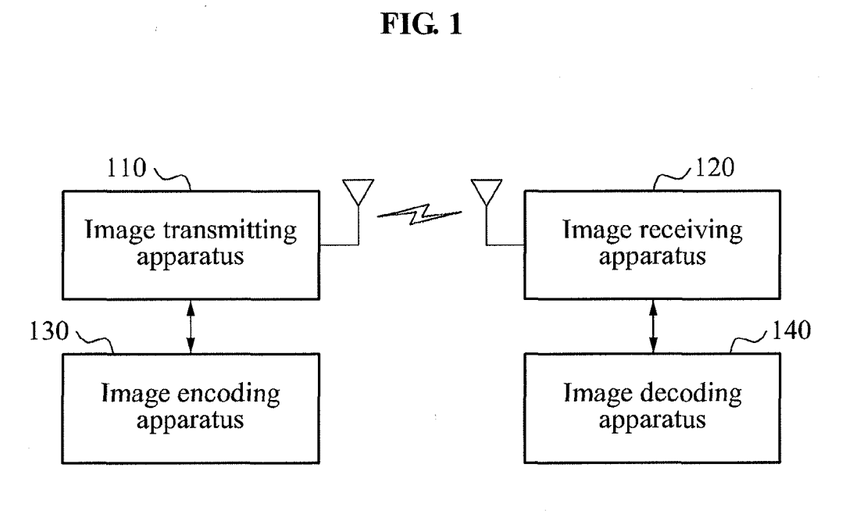
FIG. 1 is a diagram illustrating an operation of transmitting an encoded image, according to an embodiment of the present invention.

FIG. 1 is a diagram illustrating an operation of transmitting an encoded image, according to an embodiment of the present invention.

Referring to FIG. 1, an image transmitting apparatus 110 may receive an encoded image from an image encoding apparatus 130, and transmit the received encoded image to an image receiving apparatus 120. For example, the image transmitting apparatus 110 may stream the encoded image to the image receiving apparatus 120 in real time.

The image transmitting apparatus 110 may measure a network state with respect to the image receiving apparatus 120 and inform the image encoding apparatus 130 of the network state. For example, the image transmitting apparatus 110 may measure at least one of a received signal strength indication (RSSI) and a signal to interference-plus-noise ratio (SINR) with respect to the image receiving apparatus 120, and inform the image encoding apparatus 130 of the measurement result.

According to another embodiment, the image transmitting apparatus 110 may transmit the encoded image to the image receiving apparatus 120 by passing through an access point (AP). In this case, the image transmitting apparatus 110 may measure a network state with respect to the AP and inform the image encoding apparatus 130 of the network state.

The image receiving apparatus 120 may receive the encoded image from the image transmitting apparatus 110. The image receiving apparatus 120 may receive the encoded image and transmit the received encoded image to an image decoding apparatus 140. In addition, the image receiving apparatus 120 may measure a network state with respect to the image transmitting apparatus 110 and inform the image transmitting apparatus 110 of the network state. For example, the image receiving apparatus 120 may measure at least one of an RSSI and an SINR, and inform the image transmitting apparatus 110 of the measurement result.

According to another embodiment, the image receiving apparatus 120 may determine a compression rate to function as a standard for image compression, based on at least one of a signal strength and an SINR with respect to the image transmitting apparatus 110. Also, the image receiving apparatus 120 may transmit the compression rate to the image transmitting apparatus 110. In this case, the image transmitting apparatus 110 may transmit the compression rate to the image encoding apparatus 130. The image encoding apparatus 130 may perform image compression based on the compression rate.

The image encoding apparatus 130 may encode an input image. The image encoding apparatus 130 may transmit the encoded input image to the image transmitting apparatus 110, and may receive information on a network state, such as a signal strength or an SINR, from the image transmitting apparatus 110.

The image encoding apparatus 130 may adaptively encode the input image based on the information on the network state. The image encoding apparatus 130 may determine a quantity of data to be transmitted, by determining the compression rate of the image based on a communication environment of the image receiving apparatus 120. Therefore, the image encoding apparatus 130 may enable the image transmitting apparatus 110 to provide an image content ceaselessly. The image encoding apparatus 130 may be provided in the image transmitting apparatus 110 or separately from the image transmitting apparatus 110.

The image decoding apparatus 140 may decode the encoded image. The image decoding apparatus 140 may receive the encoded image from the image receiving apparatus 120 and perform decoding. Also, the image decoding apparatus 140 may reconstruct the compressed image to an original state. The image decoding apparatus 140 may be provided in the image receiving apparatus 120 or separately from the image receiving apparatus 120.

Figure 2:
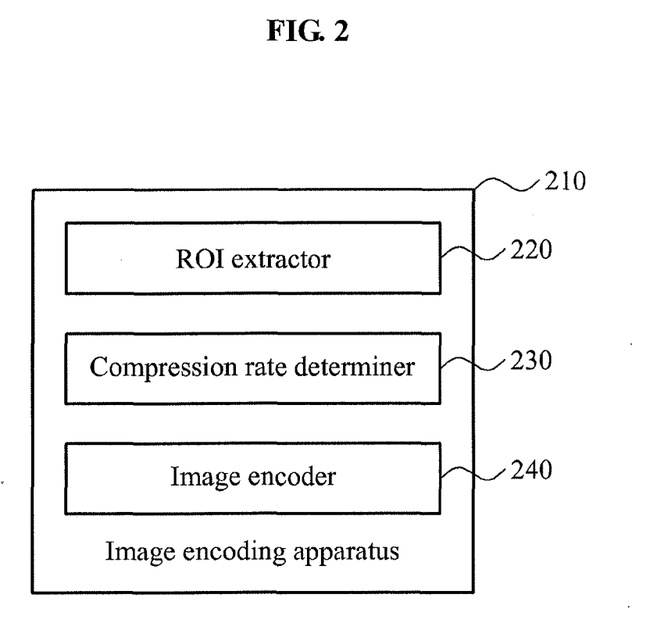
FIG. 2 is a diagram illustrating a detailed configuration of an image encoding apparatus, according to an embodiment of the present invention.

FIG. 2 is a diagram illustrating a detailed configuration of an image encoding apparatus 210, according to an embodiment of the present invention.

Referring to FIG. 2, the image encoding apparatus 210 includes a region of importance (ROI) extractor 220, a compression rate determiner 230, and an image encoder 240. The image encoding apparatus 210 may perform an image encoding method illustrated in FIG. 7.

Figure 7:
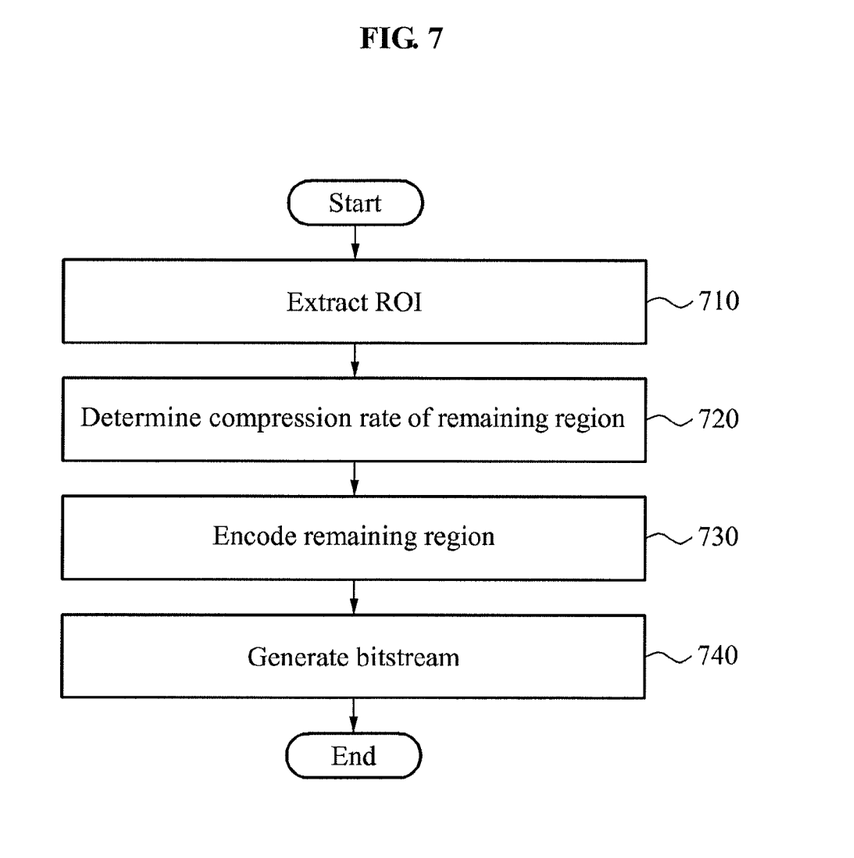
FIG. 7 is a flowchart illustrating an image encoding method according to an embodiment of the present invention.

In operation 710, the ROI extractor 220 may extract a ROI from an input image. The ROI extractor 220 may extract the ROI recognized as a moving object using a depth image corresponding to the input image, or may extract the ROI from the input image using a background removal technology.

For example, when using the background removal technology, the ROI extractor 220 may extract the ROI from the input image using Equation 1.

$$|frame_i - frame_{background}| > Th \qquad \text{[Equation 1]}$$

Here, $frame_i$ denotes the image to be transmitted, $frame_{background}$ denotes an entire background image of the image to be transmitted, and Th denotes a threshold value. For example, when $|frame_i - frame_{background}|$ is greater than Th, the ROI extractor 220 may determine the ROI of the input image and determine a remaining region as a background. The ROI extractor 220 may obtain an image silhouette of the moving object and extract the ROI based on the image silhouette, using Equation 1.

The image encoding apparatus 210 may maintain an optimal image quality with respect to the ROI extracted by the ROI extractor 220, and perform image compression with respect to the remaining region based on the network state. Thus, the image encoding apparatus 210 may compress the image while including a necessary part of the image.

In operation 720, the compression rate determiner 230 may determine a compression rate of the remaining region excluding the ROI.

For example, the compression rate determiner 230 may reduce the compression rate of the remaining region according to an increase in a signal strength between an image transmitting apparatus and an image receiving apparatus. That is, the compression determiner 230 may adaptively determine the compression rate of the remaining region according to the wireless communication environment between the image transmitting apparatus and the image receiving apparatus, thereby controlling the quantity of data to be transmitted.

For example, when the signal strength between the image transmitting apparatus and the image receiving apparatus is relatively low, the compression rate determiner 230 may reduce the quantity of data to be transmitted, by increasing the compression rate of the remaining region. Accordingly, the image encoding apparatus 210 may enable the image transmitting apparatus to ceaselessly provide the image content to the image receiving apparatus. The image encoding apparatus 210 may maintain the original image quality of the ROI by not performing image compression with respect to the ROI, so that the image transmitting apparatus may provide a high quality image content.

Conversely, when the signal strength is relatively high, the compression rate determiner 230 may give priority to the image quality by reducing the compression rate of the remaining region.

According to another embodiment, the compression rate determiner 230 may set a transmission ratio with respect to the remaining region. The transmission ratio may refer to a ratio between a quantity of an original data and the quantity of data to be transmitted to the image receiving apparatus after the image compression is performed. The compression rate determiner 230 may set the transmission ratio with respect to the remaining region, based on a network environment between the image transmitting apparatus and the image receiving apparatus. The compression rate determiner 230 may determine the compression rate based on the transmission ratio set for each area.

Although operation 710 is described prior to operation 720, the operation order of the image encoding apparatus 210 is not limited to the foregoing description. Therefore, the extraction of operation 710 may be performed after or simultaneously with the determining of the compression rate of operation 720.

In operation 730, an image encoder 240 may encode the remaining region based on the compression rate determined by the compression rate determiner 230.

First, the image encoder 240 may divide an image into macro blocks (MB) units. Through this, the image encoder 240 may reduce an image processing time.

The image encoder 240 may determine a number of entire MBs to be applied to the image, based on resolution of the image or size of the MB. For example, the image encoder 240 may increase the number of entire MBs to be applied to the image according to an increase in resolution of the image.

In addition, the image encoder 240 may determine a number of MBs to be designated as the ROI, based on the network state. For example, the image encoder 240 may increase the number of the MBs to be designated to be the ROI according to an increase in the signal strength between the image transmitting apparatus and the image receiving apparatus.

The image encoder 240 may perform discrete cosine transform (DCT) with respect to the remaining region divided into the MB units. The image encoder 240 may transform image data into a frequency band through DCT.

The image encoder 240 may transform the remaining region into the frequency band through DCT and then generate a bitstream in the form of a macro string using zigzag scanning.

Next, the image encoder 240 may reduce the length of the bitstream generated based on the compression rate determined by the compression rate determiner 230. In detail, the image encoder 240 may cut out a result value of a relatively high frequency band from result values obtained by DCT of the remaining region, according to the compression rate determined by the compression rate determiner 230.

Hereinafter, a process of cutting out the result value of the high frequency from the result values obtained by DCT of the remaining region will be referred to as DCT-CUT.

The image encoder 240 may reduce the quantity of data to be transmitted to the image receiving apparatus through DCT-CUT. In addition, the image encoder 240 may perform image compression using DCT-CUT without having to perform quantization. Accordingly, the image encoder 240 may reduce the time consumed by the image compression. Since DCT-CUT is performed on the basis of DCT of the image, joint photographic experts group (JPEG) or moving picture experts group (MPEG) compression technology may be compatibly used.

The image encoder 240 may adaptively cut out the result value of the high frequency band among the result values of DCT performed with respect to the remaining region, based on the signal strength between the image transmitting apparatus and the image receiving apparatus. That is, the remaining region may be adaptively encoded based on the network states of the image transmitting apparatus and the image receiving apparatus.

In addition, the image encoder 240 may determine an MB corresponding to the ROI in the image divided into the MB units. A number of the MBs to be designated as the ROI may be adaptively determined according to the network state. The image encoder 240 may transform the MB corresponding to the ROI into the frequency band through DCT. In this case, the image encoder 240 may use an index of the MB corresponding to the ROI.

According to another embodiment, after performing DCT-CUT, the image encoder 240 may further compress data resulting from DCT-CUT, that is, DCT-CUT result data, to further reduce the size of the data to be transmitted. The image encoder 240 may quantize the DCT-CUT result data to reduce the size of the data. The image encoder 240 may quantize an encoding result of the remaining region to a value of a predetermined range, and store information used for quantization in a bitstream. For example, the image encoder 240 may transform the DCT-CUT result data of a double size into a char size according to Equations 2 to 4. The DCT-CUT result data may be quantized to a range from 0 to 255 according to Equations 2 to 4.

$$r_{ratio} = \frac{\text{abs}(r_{min}) + r_{max}}{255} \qquad \text{[Equation 2]}$$

The image encoder 240 may determine a quantization ratio $r_{ratio}$ with respect to the DCT-CUT result data using Equation 2. $r_{min}$ denotes a minimum value of the DCT-CUT result data and abs($r_{min}$) denotes an absolute value of $r_{min}$. $r_{max}$ denotes a maximum value of the DCT-CUT result data.

$$r_{intermediate} = \frac{\text{abs}(r_{min})}{r_{ratio}} \qquad \text{[Equation 3]}$$

The image encoder 240 may determine an intermediate value $r_{intermediate}$ using a result of Equation 2 and using Equation 3. The intermediate value $r_{intermediate}$ indicates whether the quantized value is a negative number or a positive number.

$$r_{value} = \frac{\rho[i]}{r_{ratio}} + r_{intermediate} \qquad \text{[Equation 4]}$$

Figure 6:
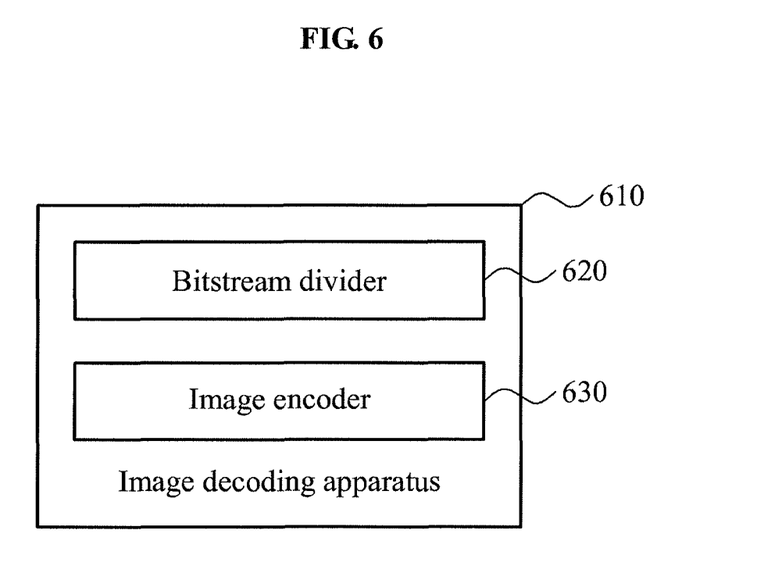
FIG. 6 is a diagram illustrating a detailed configuration of an image decoding apparatus according to an embodiment of the present invention.

The image encoder 240 may determine a quantized value $r_{value}$ using a result of Equations 2 and 3 and using Equation 4. ρ[i] denotes a value of before quantization of the DCT-CUT result data, that is, a value to be quantized. For example, when the DCT-CUT result data is [457, −24, 9, 3, −1], the image encoder 240 may quantize [457, −24, 9, 3, −1] into [255, 0, 18, 14, 12] using Equations 2 to 4. Accordingly, a number of bytes necessary for expressing the DCT-CUT result data may be reduced. The image encoder 240 may generate information related to the quantization ratio $r_{ratio}$ and the intermediate value $r_{intermediate}$ in the form of the bitstream along with the compressed image data. The information related to the quantization ratio $r_{ratio}$ and the intermediate value $r_{intermediate}$ used for quantization of the DCT-CUT result data may be transmitted to an image decoding apparatus 610 and used for decoding of an image.

For example, the image decoding apparatus 610 may extract the information related to the quantization ratio $r_{ratio}$ and the intermediate value $r_{intermediate}$ from the bitstream, and reconstruct original DCT-CUT result data using the quantization ratio $r_{ratio}$ and the intermediate value $r_{intermediate}$ based on Equations 5 and 6.

$$Val_{intermediate} = q[i] - r_{intermediate} \qquad \text{[Equation 5]}$$

The image decoding apparatus 610 may determine a value $Val_{intermediate}$ obtained by subtracting the intermediate value $r_{intermediate}$ from the quantized value q[i] included in the bitstream, based on Equation 5.

$$\rho'[i] = Val_{intermediate} * r_{ratio} \qquad \text{[Equation 6]}$$

After that, the image decoding apparatus 610 may determine the reconstructed DCT-CUT result data ρ'[i] by multiplying the value $Val_{intermediate}$ by the quantization ratio $r_{ratio}$ as shown in Equation 6. Through the foregoing process, the DCT-CUT result data compressed to the char size according to Equations 2 to 4 may be reconstructed to the double size.

According to an embodiment, the image encoder 240 may determine whether to additionally perform quantization, based on the network state or the size of the DCT-CUT result data. For example, when a transmission strength or signal strength is measured to be low or when the size of the DCT-CUT result data is larger than a predetermined threshold value, the image encoder 240 may determine to additionally perform quantization.

In operation 740, the image encoder 240 may generate a bitstream by finally combining an encoded remaining region with a non-encoded ROI. In an example, the image encoder 240 may generate the bitstream by combining MBs of the ROI and MBs of the encoded remaining region. In this case, the image encoder 240 may add packet data related to image compression to the bitstream.

The packet data may include a number of MBs applied to the image, a width of the image, a height of the image, a length of a bitstream in the form of a macro string, a width of an MB, a height of the MB, a number of rows of MBs, a number of columns of the MBs, a number of MBs corresponding to the ROI, and an index of the MBs corresponding to the ROI.

The image encoding apparatus 210 may extract the ROI from the image and adaptively determine the compression rate of the image according to the network environment, thereby providing a high quality image even in the wireless communication environment. The image encoding apparatus 210 may maintain quality almost of the original image by not performing encoding with respect to the ROI. With respect to the remaining region not extracted as the ROI, the image encoding apparatus 210 may control quantity of the data to be transmitted using DCT-CUT.

Figure 3:
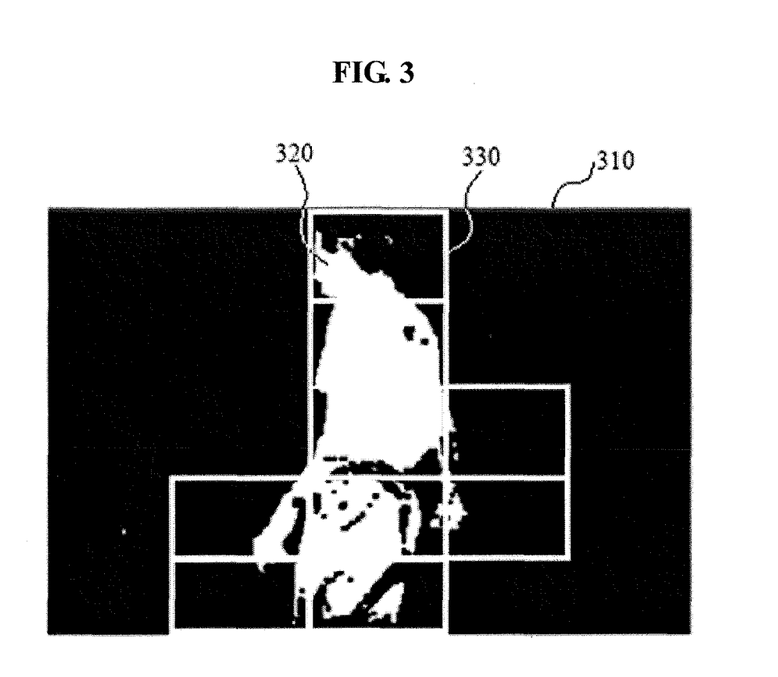
FIG. 3 is a diagram illustrating an example of extracting a region of importance (ROI) from an image using a background removal technology and determining a macro block corresponding to the ROI, according to an embodiment of the present invention.

FIG. 3 is a diagram illustrating an example of extracting a ROI from an image using the background removal technology and determining a macro block corresponding to the ROI, according to an embodiment of the present invention.

According to the example, an image encoding apparatus may obtain an image silhouette of a moving object by removing an entire background image of an image 310 to be transmitted from the image 310. The image encoding apparatus may extract a ROI 320 based on the image silhouette and determine an MB 330 corresponding to the ROI.

In FIG. 3, the image 310 includes an image silhouette of a shape of a human body and nine MBs 330 determined to be the ROI. The image encoding apparatus may determine the number of entire MBs to be applied to the image, based on resolution of the image or size of the image. In addition, the image encoding apparatus may determine the number of the MBs 330 to be designated as the ROI based on the network state.

Figure 4A:
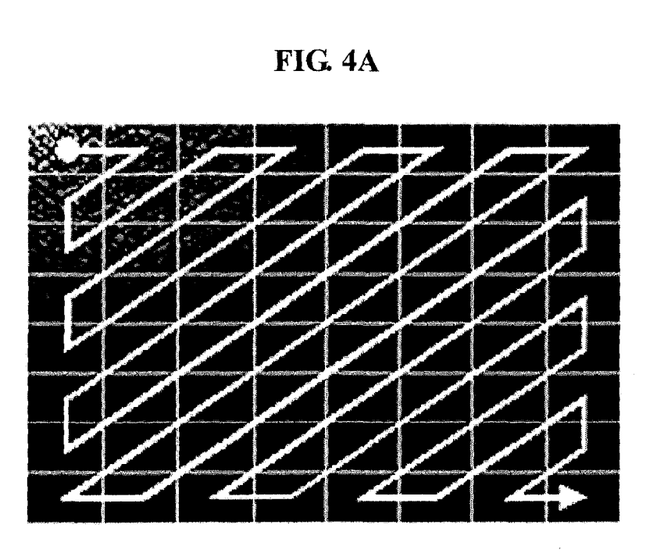
FIGS. 4A to 4C are diagrams illustrating an example of performing discrete cosine transform (DCT)-CUT to a remaining region based on a determined compression rate, according to an embodiment of the present invention.
Figure 4B:
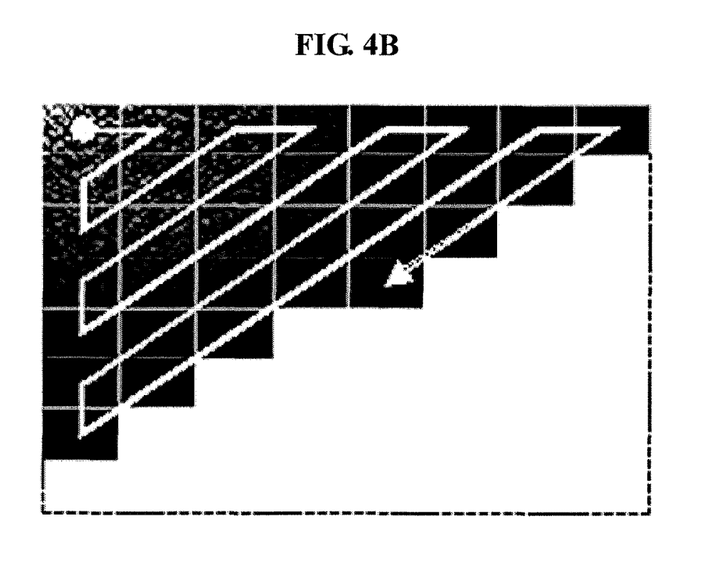
Figure 4C:
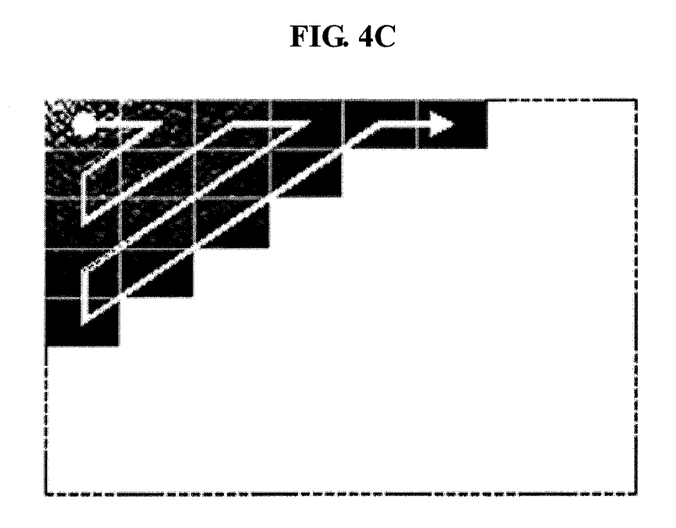

FIGS. 4A to 4C are diagrams illustrating an example of performing DCT-CUT to a remaining region based on a determined compression rate, according to an embodiment of the present invention.

In FIGS. 4A to 4C, it is presumed that DCT and zigzag transformation are performed with respect to the remaining region. In FIG. 4A, DCT is performed and then DCT-CUT is not performed. In FIG. 4B, DCT is performed and then DCT-CUT is performed so that only about 50% of data remains. In FIG. 4C, the DCT is performed and then DCT-CUT is performed so that only about 25% of data remains.

When the signal strength between an image transmitting apparatus and an image receiving apparatus is sufficient, the image encoding apparatus may provide the image data maintaining the original image quality, without cutting out the DCT transformed data of the remaining region as shown in FIG. 4A.

When disconnection occurs during image output, the image encoding apparatus may reduce a data quantity of the remaining region using DCT-CUT as shown in FIG. 4B or 4C. In this case, the image encoding apparatus may control the quantity of data to be cut out by DCT-CUT, based on the signal strength between the image transmitting apparatus and the image receiving apparatus. As shown in FIG. 4C, the image encoding apparatus may cut out more data as the signal strength is weaker, thereby reducing the quantity of data to be transmitted.

Figure 5:
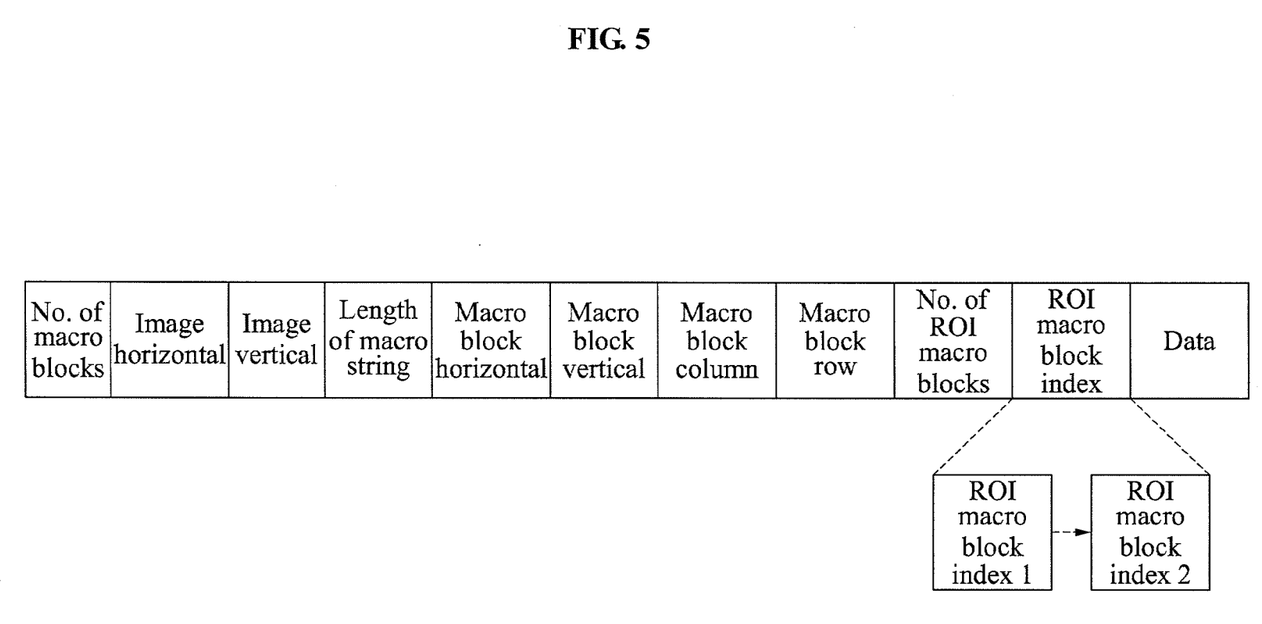
FIG. 5 is a diagram illustrating packet data according to an embodiment of the present invention.

FIG. 5 is a diagram illustrating packet data according to an embodiment of the present invention.

Referring to FIG. 5, the packet data may include a number of MBs applied to the image, a width of the image, a height of the image, a length of a macro string, a width of an MB, a height of the MB, a number of rows of MBs, a number of columns of the MBs, a number of MBs corresponding to the ROI, and an index of the MBs corresponding to the ROI. That is, the packet data may include information necessary for reconstructing the image in the image decoding apparatus.

According to another embodiment, DCT-CUT may be performed with respect to the image and quantization may be additionally performed to reduce size of the data. In this case, the packet data may further include information used in quantization. The image decoding apparatus may extract the information used in quantization from the packet data and reconstruct the quantized data using the extracted information.

The packet data may be combined with the image data of the ROI and the encoded image data of the remaining region. In FIG. 5, the image data of the ROI and the encoded image data of the remaining region are arranged in a last position. However, the data type and the arrangement order of the data of FIG. 5 are only an example to help understanding of the embodiment but are not limiting.

FIG. 6 is a diagram illustrating a detailed configuration of an image decoding apparatus 610 according to an embodiment of the present invention.

Referring to FIG. 6, the image decoding apparatus 610 may include a bitstream divider 620 and an image decoder 630. The image decoding apparatus 610 may perform an image decoding method illustrated in FIG. 8.

Figure 8:
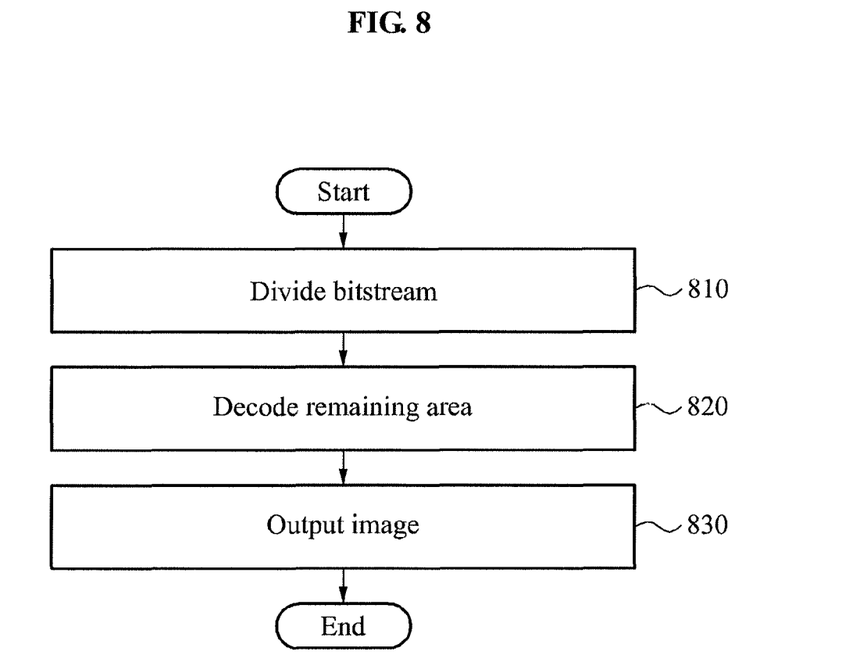
FIG. 8 is a flowchart illustrating image decoding method according to an embodiment of the present invention.

In operation 810, the bitstream divider 620 may divide a bitstream transmitted by the image transmitting apparatus based on the number of the MBs applied to the image. The bitstream divider 620 may divide the bitstream based on the packet data transmitted by the image transmitting apparatus. For example, the bitstream divider 620 may divide data corresponding to the ROI out of the bitstream, based on the number of the MBs corresponding to the ROI.

According to another embodiment, after the image encoding apparatus 210 performs DCT-CUT and further compresses the DCT-CUT result data to reduce the sizes of the DCT-CUT result data, the bitstream divider 620 may reconstruct the quantized data using the information used in quantization of the DCT-CUT result data. For example, the bitstream divider 620 may extract information related to the quantization ratio and the intermediate value from the bitstream, and reconstruct data of before quantization using the quantization ratio and the intermediate value. The process of reconstructing the quantized data may be performed before, after, or simultaneously with operation 810.

In operation 820, the image decoder 630 may decode the remaining region excluding the ROI of the image in the divided bitstream. Specifically, the image decoder 630 may perform inverse DCT (iDCT) for reconstructing a result value of DCT performed with respect to the remaining region. The image decoder 630 may use the packet data when reconstructing the received bitstream into the image.

The image decoder 630 may perform inverse zigzag scanning based on the divided bitstream. The image decoder 620 may determine a portion cut out by DCT-CUT in the remaining region through the inverse zigzag scanning. The image decoder 630 may decode a result value cut out during the decoding among DCT result values of the remaining region, using zero padding. The image decoder 630 may reconstruct the image of the remaining region by performing iDCT with respect to a result value of the zero padding.

In operation 830, the image decoder 630 may output an image of before compression, by combining the decoded remaining region and the ROI. The image decoder 630 may perform iDCT also to the ROI and may generate one output image from the MBs by combining iDCT result values with the decoded remaining region.

Figure 9:
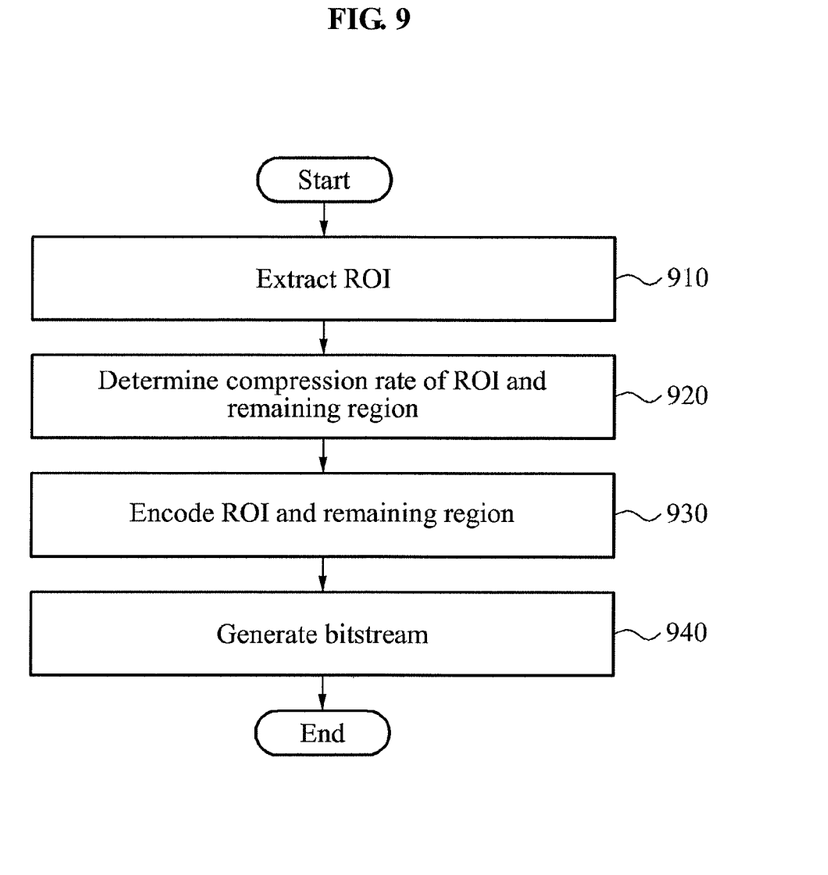
FIG. 9 is a flowchart illustrating an image encoding method according to another embodiment of the present invention.

FIG. 9 is a flowchart illustrating an image encoding method according to another embodiment of the present invention.

The image encoding apparatus 210 may perform the image encoding method of FIG. 9.

In operation 910, the image encoding apparatus 210 may extract the ROI from the input image. For example, the image encoding apparatus 210 may extract the ROI recognized as a moving object using a depth image corresponding to the input image, or extract the ROI from the input image using the background removal technology. Since operation 910 is same as operation 710 of FIG. 7, a detailed description will be omitted.

In operation 920, the image encoding apparatus 210 may determine the compression rate of the ROI and the remaining region excluding the ROI from the image, based on a network state between the image transmitting apparatus and the image receiving apparatus.

When only the remaining region not the ROI is encoded, the image may not be normally transmitted or streamed depending on the network state. Therefore, a threshold value related to the network state may be predetermined by a system designer. Therefore, when the network state is not greater than the threshold value, the image encoding apparatus 210 may perform image compression even with respect to the ROI.

When the network state between the image transmitting apparatus and the image receiving apparatus is not greater than the threshold value, the image encoding apparatus 210 may perform image compression with respect to not only the remaining region but also the ROI. For example, when a signal strength between the image transmitting apparatus and the image receiving apparatus is not greater than the threshold value, the image encoding apparatus 210 may determine the compression rate with respect to the remaining region and the ROI based on the signal strength.

Here, the image encoding apparatus 210 may set the compression rate of the remaining region to be higher than the compression rate of the ROI, and reduce the compression rates of the ROI and the remaining region according to an increase in the signal strength.

The image encoding apparatus 210 may give higher priority to quality of the ROI by setting the compression rate of the remaining region to be higher than the compression rate of the ROI. Accordingly, quality deterioration perceived by the user according to the compression may be reduced.

In addition, the image encoding apparatus 210 may reduce the compression rates of the ROI and the remaining region as the network state is better, for example, as the signal strength is stronger, accordingly performing optimized image encoding. Consequently, the image encoding apparatus 210 may determine the optimal compression rate not causing interruption of a streaming service, based on the network state.

In operation 930, the image encoding apparatus 210 may encode the ROI and the remaining region based on the determined compression rates.

The image encoding apparatus 210 may divide the image into MB units, and encode the ROI and the remaining region based on the MB units. The image encoding apparatus 210 may generate macro strings from the ROI and the remaining region, using DCT and zigzag scanning.

The image encoding apparatus 210 may reduce data quantity of the generated macro strings based on the compression rates set to the ROI and the remaining region. For example, the image encoding apparatus 210 may cut out a result value of a relatively high frequency band from DCT result values according to the compression rates.

According to another embodiment, after cutting out the result value of the relatively high frequency band, the image encoding apparatus 210 may further compress the result data to further reduce the size of data to be transmitted. That is, the image encoding apparatus 210 may quantize data of which the result value of the relatively high frequency band is cut out into a value of a predetermined range to reduce the data size.

In operation 940, the image encoding apparatus 210 may generate a bitstream by combining the encoded ROI with the remaining region. The image encoding apparatus 210 may generate the bitstream by finally encoded ROI with the remaining region. Here, the image encoding apparatus 210 may add packet data related to image compression to the bitstream.

Figure 10:
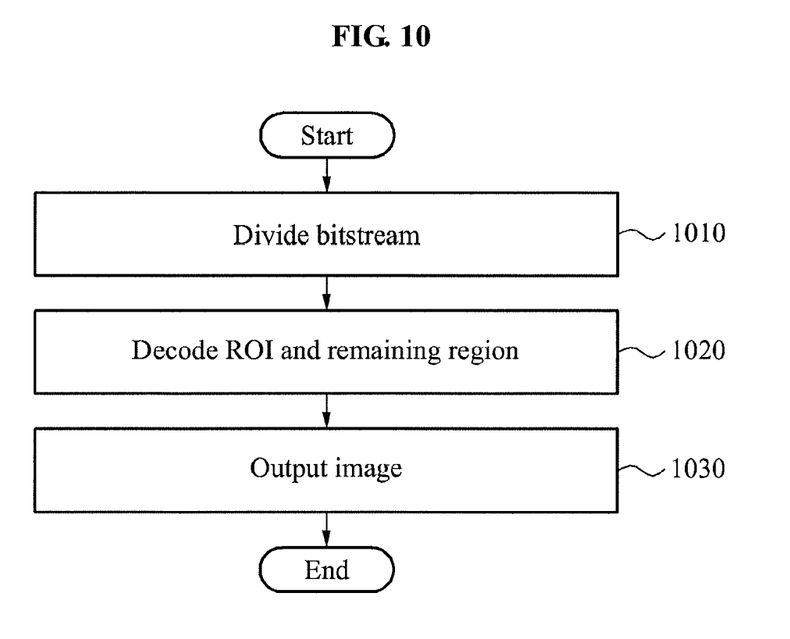
FIG. 10 is a flowchart illustrating an image decoding method according to another embodiment of the present invention.

FIG. 10 is a flowchart illustrating an image decoding method according to another embodiment of the present invention.

The image decoding apparatus 610 may perform the image decoding method of FIG. 10.

In operation 1010, the image decoding apparatus 610 may divide a bitstream transmitted by the image transmitting apparatus based on the number of MBs applied to the image. In this case, the image decoding apparatus 610 may divide the bitstream based on the packet data that includes compression information of the image.

According to another embodiment, when the image encoding apparatus 210 quantizes the data of which the result value of the relatively high frequency band is cut out into the value of the predetermined range, the image decoding apparatus 610 may reconstruct the quantized data into the original data using the information used for quantization.

In operation 1020, the image decoding apparatus 610 may decode the ROI and the remaining region excluding the ROI based on compression rates adaptively determined according to the network state between the image transmitting apparatus and the image receiving apparatus in the divided bitstream. The compression rate of the remaining region may be greater than the compression rate of the ROI and may be reduced according to a decrease in the signal strength between the image transmitting apparatus and the image receiving apparatus.

The image decoding apparatus 610 may determine cutout data in the ROI and the remaining region using inverse zigzag scanning, and may decode the cutout data by zero padding. The image decoding apparatus 610 may reconstruct the image of the ROI and the remaining region by performing iDCT with respect to the result value of zero padding.

In operation 1030, the image decoding apparatus 610 may output an image of before compression by combining the decoded ROI with the remaining region. The image decoding apparatus 610 may generate one output image from the MBs by combining iDCT result values of the ROI and the remaining region.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An image encoding method for an image transmitted between an image transmitting apparatus and an image receiving apparatus, the method comprising:
   extracting a region of importance (ROI) from an input image;
   determining a compression rate of a remaining region excluding the ROI of the image based on a network state between the image transmitting apparatus and the image receiving apparatus; and
   encoding the remaining region based on the compression rate.

2. The image encoding method of claim 1, wherein the determining comprises reducing the compression rate of the remaining region according to an increase in a signal strength between the image transmitting apparatus and the image receiving apparatus.

3. The image encoding method of claim 1, wherein the encoding comprises performing discrete cosine transform (DCT) with respect to the remaining region divided into macro block (MB) units.

4. The image encoding method of claim 3, wherein the encoding comprises cutting out a result value of a relatively high frequency band from result values of DCT based on the compression rate.

5. The image encoding method of claim 3, wherein the encoding comprises adaptively cutting out a result value of a relatively high frequency band from result values of DCT based on the signal strength between the image transmitting apparatus and the image receiving apparatus.

6. The image encoding method of claim 1, wherein the extracting comprises extracting the ROI from the input image using a depth image corresponding to the input image and a background removal technology.

7. The image encoding method of claim 1, further comprising:
   quantizing an encoding result into a value of a predetermined range; and
   storing information used for quantization in a bitstream.

8. The image encoding method of claim 1, further comprising:
   generating a bitstream by combining the remaining region which is encoded with the ROI which is not encoded.

9. A non-transitory computer readable recording medium storing a program to cause a computer to implement the method of claim 1.

10. An image decoding method for an image transmitted between an image transmitting apparatus and an image receiving apparatus, the method comprising:
    dividing a bitstream transmitted by the image transmitting apparatus based on a number of macro blocks (MBs) applied to the image; and
    decoding a remaining region excluding a region of importance (ROI) of the image in the divided bitstream,
    wherein the bitstream is generated by combination of the remaining region which is encoded with the ROI which is not encoded.

11. The image decoding method of claim 10, wherein the decoding of the remaining region comprises performing inverse discrete cosine transform (iDCT) by reconstructing a result value of DCT of the remaining region.

12. The image decoding method of claim 10, wherein the decoding comprises decoding a result value cut out by encoding from result values of DCT of the remaining region using zero padding.

13. The image decoding method of claim 10, wherein the decoding comprises adaptively decoding the encoded remaining region based on a signal strength between the image transmitting apparatus and the image receiving apparatus.

14. A non-transitory computer readable recording medium storing a program to cause a computer to implement the method of claim 10.

15. An image encoding method for an image transmitted between an image transmitting apparatus and an image receiving apparatus, the method comprising:
   extracting a region of importance (ROI) from an input image;
   determining compression rates of the ROI and a remaining region excluding the ROI of the image based on a network state between the image transmitting apparatus and the image receiving apparatus; and
   encoding the ROI and the remaining region based on the compression rates.

16. The image encoding method of claim 15, wherein the determining comprises determining the compression rate of the remaining region to be greater than the compression rate of the ROI, and reducing the compression rate of the ROI and the remaining region according to an increase in a signal strength between the image transmitting apparatus and the image receiving apparatus.

17. An image decoding method for an image transmitted between an image transmitting apparatus and an image receiving apparatus, the method comprising:
   dividing a bitstream transmitted by the image transmitting apparatus based on a number of macro blocks (MBs) applied to the image; and
   decoding a region of importance (ROI) and a remaining region excluding the ROI of the image, based on a compression rate adaptively determined according to a network state between the image transmitting apparatus and the image receiving apparatus.

18. The image decoding method of claim 17, wherein a compression rate of the remaining region is greater than a compression rate of the ROI and reduced according to an increase in a signal strength between the image transmitting apparatus and the image receiving apparatus.

* * * * *